United States Patent [19]
Thome

[11] Patent Number: 5,454,081
[45] Date of Patent: Sep. 26, 1995

[54] EXPANSION BUS TYPE DETERMINATION APPARATUS

[75] Inventor: Gary W. Thome, Houston, Tex.

[73] Assignee: Compaq Computer Corp., Houston, Tex.

[21] Appl. No.: 937,475

[22] Filed: Aug. 28, 1992

[51] Int. Cl.⁶ .......................... G06F 11/30; G06F 13/20; G06F 13/42

[52] U.S. Cl. ...................... 395/281; 364/DIG. 1; 364/229; 364/229.2; 364/231; 364/239; 364/239.9; 364/240; 364/240.2; 364/240.3; 364/241.9; 364/260; 364/260.1; 364/264; 364/264.2; 364/265.5; 395/284; 395/309

[58] Field of Search ........................ 395/325, 575, 395/800, 500; 364/708; 439/61; 307/465

[56] References Cited

U.S. PATENT DOCUMENTS

| | | | |
|---|---|---|---|
| 4,249,240 | 2/1981 | Barmich | 395/325 |
| 4,885,482 | 12/1989 | Sharp et al. | 307/465 |
| 4,999,805 | 5/1991 | Culley et al. | 395/325 |
| 5,036,481 | 7/1991 | Lunsford et al. | 364/708 |
| 5,043,877 | 8/1991 | Berger et al. | 395/325 |
| 5,101,492 | 3/1992 | Schultz et al. | 395/575 |
| 5,109,517 | 4/1992 | Honda et al. | 395/800 |
| 5,117,331 | 5/1992 | Gebara | 361/407 |
| 5,119,498 | 6/1992 | McNeill et al. | 395/800 |
| 5,162,675 | 11/1992 | Olsen et al. | 307/465 |
| 5,163,145 | 11/1992 | Parks | 395/500 |
| 5,163,833 | 11/1992 | Olsen et al. | 439/61 |
| 5,174,762 | 12/1992 | Hoppal et al. | 439/61 |
| 5,191,657 | 3/1992 | Ludwig et al. | 395/325 |
| 5,201,055 | 4/1993 | Izquierdo et al. | 395/800 |
| 5,210,860 | 5/1993 | Pfeffer et al. | 395/575 |
| 5,263,148 | 11/1993 | Jones, Jr. et al. | 395/500 |
| 5,287,531 | 2/1994 | Rogers, Jr. et al. | 395/800 |

Primary Examiner—Allen R. MacDonald
Assistant Examiner—Ayaz R. Sheikh
Attorney, Agent, or Firm—Pravel, Hewitt, Kimball & Krieger

[57] ABSTRACT

A circuit that automatically detects whether an input/output expansion board is connected to an EISA system or an ISA system. The circuit monitors the expansion bus for EISA slot-specific I/O cycles by sampling the bus signals AENx and BALE when either of the IORC, or IOWC, signals are asserted. When the circuit detects an EISA slot-specific I/O operation on the expansion bus, a signal is generated indicating that the expansion bus is the EISA bus. This determination allows an ISA expansion board to take advantage of certain EISA features when it is connected to an EISA system. Using a circuit to determine expansion bus type removes the need for a jumper to provide the same function, thus providing greater ease of use.

13 Claims, 2 Drawing Sheets

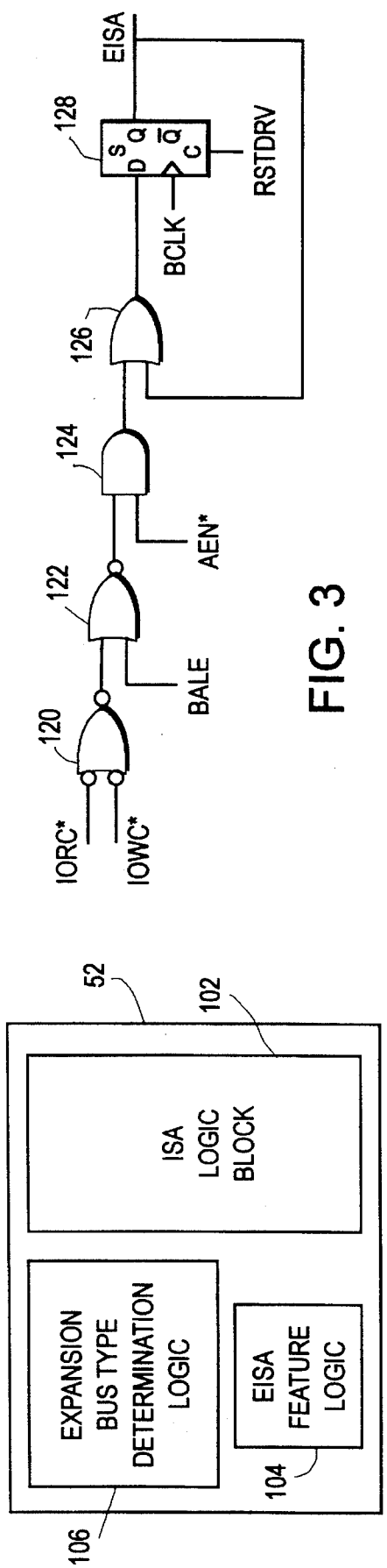
FIG. 3
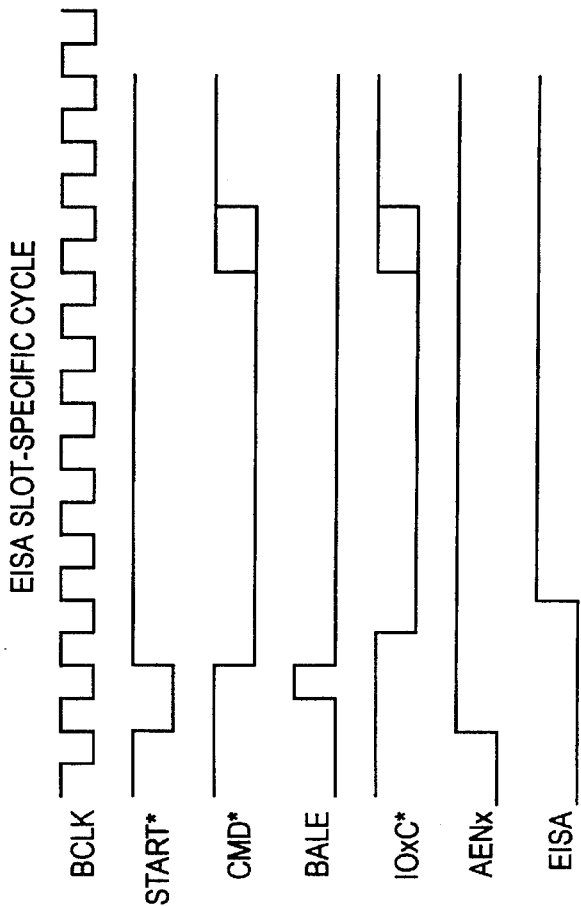
FIG. 4
FIG. 2

EXPANSION BUS TYPE DETERMINATION APPARATUS

BACKGROUND OF THE INVENTION

1. Field of the Invention

The present invention relates to expansion boards in computer systems, and more particularly to a circuit that distinguishes between different expansion bus types to allow expansion boards to take advantage of certain features offered by different expansion buses.

2. Description of the Prior Art

In 1981, International Business Machines Corp. (IBM) introduced its personal computer, the IBM PC. The bus architecture in the IBM PC included a 20 bit address bus and a 16 bit data bus and utilized a timing standard that was designed for the relatively slow memory devices available at that time. The twenty address lines were referred to as the system address lines SA<19-0>.

After the introduction of the IBM PC, memory component capabilities and speeds increased dramatically, resulting in faster memory access times. The original SA<19-0> address lines used in the IBM PC architecture incorporated a timing standard that was too slow to take advantage of these advances in memory speeds. Therefore, an extended version of the bus architecture used in the IBM PC was introduced in a new personal computer from IBM called the PC/AT. The bus architecture in the PC/AT included a new set of address lines, the latched address lines LA<23-17>, which incorporated a timing standard that took advantage of the faster memory devices. The bus interface standard used in the IBM PC/AT has generally become known as the Industry Standard Architecture (ISA).

As is inevitable in the computer and electronics industry, capabilities of the various components, including memory components and microprocessor performance, continued to increase. In order to take full advantage of these developments, an extended version of the ISA was developed called the Extended Industry Standard Architecture (EISA). EISA includes a 32-bit address bus, a 32-bit data bus, and full backwards compatibility with ISA devices and software. The EISA connector was designed to be able to receive both ISA and EISA expansion boards. When an ISA expansion board is inserted into an EISA connector, the ISA board only connects with the ISA signal lines in the EISA bus. The EISA lines remain unconnected. When an EISA expansion board is inserted into an EISA connector slot, the EISA board connects with all of the signals forming the EISA bus, including both ISA and EISA signals.

The EISA bus specification includes features that can be used by expansion boards which do not utilize the full EISA bus connector, i.e., ISA expansion boards. These features include automatic system configuration and faster DMA transfer rates. Automatic system configuration provides automatic configuration of system resources and expansion boards through software. Faster DMA transfer rates are provided by certain DMA cycle types available on the EISA bus. For more information on these features, please see the EISA specification Version 3.1 provided in U.S. Pat. No. 5,101,492 filed Sep. 3, 1989, issued Mar. 31, 1992 and entitled "Data Redundancy and Recovery Protection" by Schultz, et al., which fully explains the requirements of an EISA system and is hereby incorporated by reference.

Since these features do not require the full EISA connector, i.e., can be used with only ISA signals, it has been desirable to include logic on ISA boards which allow ISA boards to take advantage of these features. In this manner, ISA boards can perform as ISA boards in ISA systems, and can use the above-mentioned features in EISA systems. However, when the expansion board is in an ISA system, use of the EISA features must be disabled. Otherwise, the ISA board would attempt to use these EISA features in the ISA system, resulting in probably erroneous operation. When the ISA board is installed in an EISA system, the ISA board must be set to "EISA mode" to allow the board to take advantage of the EISA features discussed above. Therefore, an ISA expansion board which is designed to take advantage of the above EISA features when it is in an EISA system must be informed as to whether it is in an ISA system or an EISA system.

Currently, ISA boards that are designed to take advantage of EISA features included a jumper with two positions indicating whether the board is in an ISA or EISA system. One disadvantage to this approach is that a jumper is required to put the board in EISA mode. The EISA architecture was designed to be a jumperless architecture, and hence requiring a jumper to place an ISA board into EISA mode is undesirable. This also creates more difficulty for the end user. If the user should forget or be unaware to switch the jumper when moving the board to a different system, then the I/O board would not operate properly. Therefore, an improved method and apparatus is desired to inform an ISA board as to whether it is connected to an ISA or EISA system.

Background on the development of I/O addressing in the EISA architecture is deemed appropriate. When the specification for the EISA bus was being formulated, a major consideration was to retain compatibility with prior ISA devices. This consideration was important because a user generally desires to upgrade and improve input/output subsystems without replacing the user's existing application programs or present input/output devices and controllers. Both existing applications programs and present input/output devices represent a significant investment in time and money to the user. As discussed below, certain limitations in the ISA standard presented problems in providing additional I/O address space for EISA circuit boards while retaining compatibility with the ISA standard.

The Industry Standard Architecture has evolved through a complicated expansion path resulting from the need to overcome limitations of earlier processors, operating systems and designs. A limitation of the ISA bus standard was that the standard limited addressing input/output space of circuit boards to ten bits of address space. One fourth of that space (the condition where the two most significant bits are zero) was reserved for use by the system board and was not available to the input/output circuit boards. Hence, only a very limited amount of input/output space was available. Over time and based on usage, portions of this address area had been reserved for particular input/output devices and their controllers and thus this space was saturated by existing input/output devices. Since there was insufficient address space to allocate to new advanced input/output devices and controllers, a method was needed to provide I/O space for new EISA circuit boards while keeping the old address map unchanged.

Therefore, a principal difficulty was that, under the ISA architecture, ISA expansion boards knew when they were addressed by decoding no more than ten bits of an input/output address word communicated through the ISA bus. The address locations within the address space allocated to the board were fixed in the circuit board, i.e., the circuit board determined whether it was addressed when some upper bit subset of the input/output address word corresponded with a fixed code. Therefore it was not possible to simply allocate more bits to the input/output address space to extend the addressing space available. Existing boards did not decode those higher bits spaces and thus existing boards would interfere with the new boards attempting to utilize this extended input/output space.

Therefore, the EISA architecture was developed with a technique referred to as EISA slot-specific I/O addressing. This addressing system allows a computer system to use existing circuit boards and yet provides additional addressing space for new circuit boards fully utilizing the addressing system. EISA slot-specific I/O addressing utilizes a slot specific signal referred to as AENx wherein "x" refers to the slot number. When the respective AENx signal is negated low to a board, then the respective I/O board may respond to addresses and I/O commands on the bus. The AENx signal is asserted high to all other option slots to disable I/O accesses during an access to a particular slot-specific I/O address range. The AENx signal is asserted high during DMA cycles to prevent I/O slaves from misinterpreting DMA cycles as valid I/O cycles. A signal referred to as BALE is an ISA signal that indicates that a valid address is present on the address lines. The BALE signal is high during a DMA or a 16 bit ISA bus master operation.

The EISA slot-specific addressing system works generally as follows. Previously, when the A8 and A9 address bits were zero during an input/output space operation, system board devices were addressed. In the EISA slot-specific addressing system, when these bits are both zero, the A12-A15 bits are used to determine the specific slot or location which is being addressed. The zero slot is assigned to the system board for compatibility reasons. The remaining slots 1–15 are available for EISA expansion boards. When the A8 and A9 bits are zero during an input/output space operation and a respective slot is being addressed, its AENx line is negated low, with the individual AENx lines to each of the other slots being high to disable operation of any additional installed circuit boards.. In this manner, EISA expansion boards can be allocated I/O address space that does not conflict with current ISA expansion boards. Also, as previously mentioned, the BALE signal is negated during a slot-specific I/O cycle. To allow use of ISA boards, the EISA addressing system sets all of the AENx lines low if either the A8 or A9 address bit is a one and an input/output space operation is occurring. Additionally, the AENx lines are low during memory space operations and high during direct memory access operations to conform to the ISA standard. For more information on the EISA slot-specific addressing system, please see U.S. Pat. No. 4,999,805 titled "Extended Input/Output Circuit Board Addressing System" by Culley et al., which is hereby incorporated by reference.

SUMMARY OF THE INVENTION

The present invention includes logic circuitry that preferably resides on an ISA I/O expansion board that automatically detects whether the board is situated in an EISA system or an ISA system. The circuit monitors the expansion bus for EISA slot-specific I/O cycles. When the circuit detects a slot-specific I/O operation on the expansion bus, a signal referred to as EISA is generated, indicating that the I/O bus is the EISA bus. The EISA signal remains asserted until the expansion board reset. If the circuit does not detect any slot-specific I/O cycles, then the EISA signal remains negated.

The detection circuit samples the ISA bus signals AENx and BALE on the rising edge of the BCLK signal when either of the IORC, or IOWC, signals are asserted. If the AENx signal to the respective expansion board is detected as asserted and the BALE signal is detected as negated when either of the IORC, or IOWC, signals are asserted, then the circuit determines that it is installed in an EISA system. The particular cycle being decoded is a slot-specific I/O access, which can only occur in an EISA system. Also, in an EISA system, slot-specific I/O accesses always occur before any expansion boards are addressed, and thus the board can take advantage of the EISA features before it is accessed.

Using a circuit to automatically determine the type of expansion bus removes the need for a jumper to provide the same function. This allows an end user to use ISA expansion boards which include EISA functions without having to set any jumpers or switches, thus providing greater ease of use.

BRIEF DESCRIPTION OF THE DRAWINGS

A better understanding of the present invention can be obtained when the following detailed description of the preferred embodiment is considered in conjunction with the following drawings, in which:

FIG. 2 is a block diagram of the ISA expansion board of FIG. 1;

FIG. 3 is a schematic diagram of one embodiment of the expansion bus type determination logic located in the expansion board of FIG. 2; and FIG. 4 is a timing diagram of operation of the expansion bus type determination logic of FIG. 2.

DESCRIPTION OF THE PREFERRED EMBODIMENT

Figure 1:
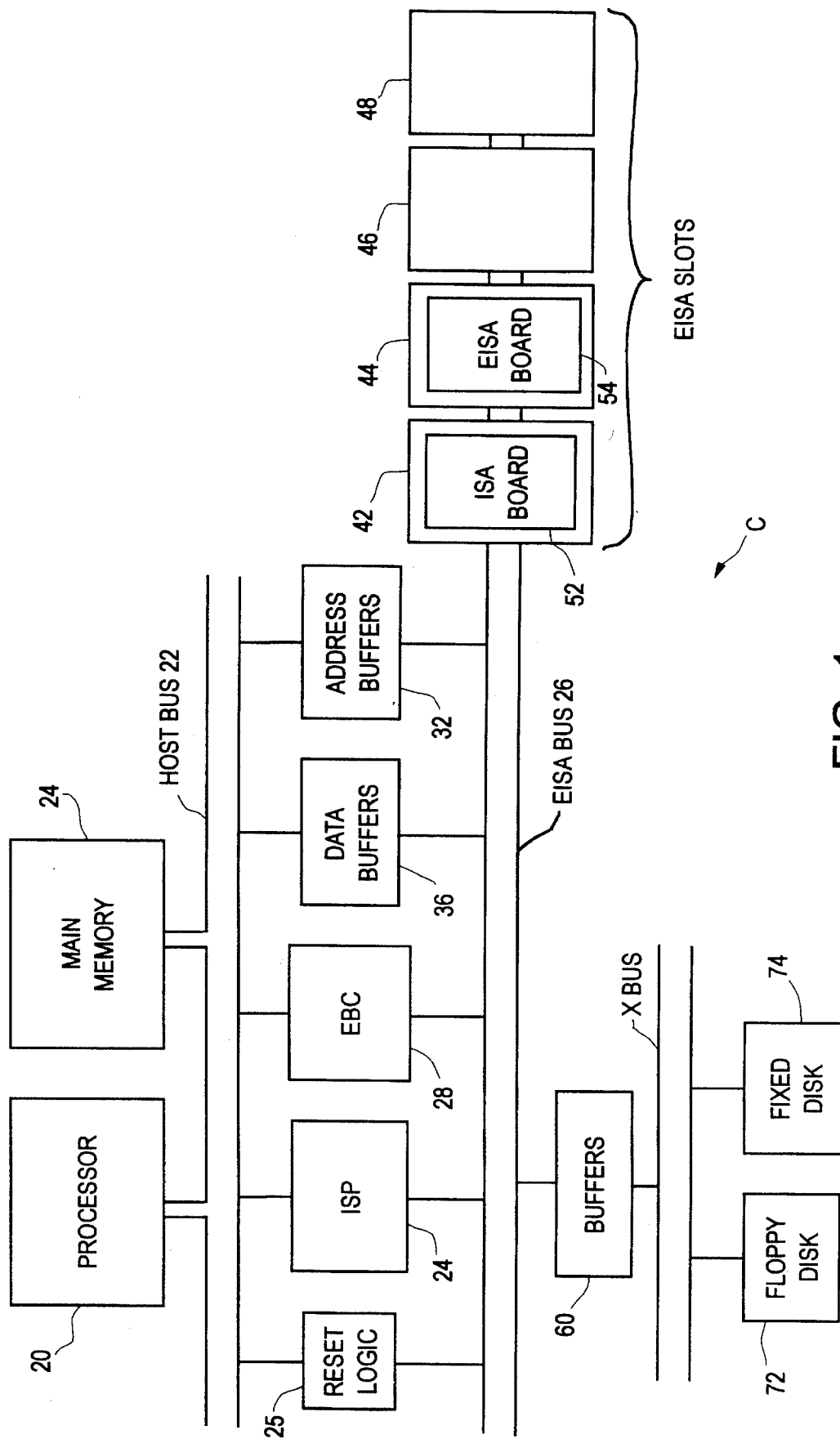
FIG. 1 is a schematic block diagram of a computer system incorporating the present invention.

Referring now to FIG. 1, the letter C designates a computer system incorporating the present invention. System C is comprised of a number of block elements interconnected via three buses. Throughout this specification, signal mnemonics with an asterisk following the signal descriptor indicates the signal is active at a logic low level and is the inverse of the signal without the asterisk. The details of the portion of the system illustrated in FIG. 1 that are not discussed in detail below are not significant to the present invention other than to illustrate an example of a fully configured computer system.

In FIG. 1, a computer system C is depicted. The system includes a microprocessor 20 connected to a memory or host bus 22. Main Memory or Random Access Memory (RAM) 24 is also connected to the Host Bus 22. The system C includes an Extended Industry Standard Architecture (EISA) bus 26 connected to the host bus 22 through an EISA bus controller (EBC) 28. In addition, data latches and transceivers 30 and address latches and buffers 32 interface between the EISA bus 26 and the host bus 22. Also illustrated in FIG. 1 is an integrated system peripheral (ISP) 24 connected to both the host bus 22 and the EISA bus 26, which incorporates a number of the elements used in an EISA-based computer system. Reset logic 25 is also coupled to the host bus 22 and the EISA bus 26. The EISA specification Version 3.1 previously referenced fully explains the requirements of an EISA system.

As previously mentioned, the EISA bus is a superset of the ISA bus and includes the necessary signals forming the ISA bus as well as additional address, data, and control signals to form the EISA bus. A number of EISA slots 42, 44, 46 and 48 are connected to the EISA bus 26. Each of the slots 42-28 include connectors that are capable of receiving both EISA and ISA circuit boards. The slot 42 preferably includes an ISA circuit board 52 and the slot 44 preferably includes an EISA circuit board 54. As discussed in the background, the EISA circuit board 54 connects to the EISA slot in such a way that the board contacts all of the signals forming the EISA bus 26. The ISA circuit board 52 connects in such a way that the board only contacts the ISA signal portion of the bus 26. The EISA signals remain unconnected. The ISA circuit board 52 includes logic according to the present invention which detects whether the board 52 is in an ISA system or an EISA system.

The EISA bus 26 is connected through buffers 60 to an X bus 62. A number of peripheral devices are connected to the X bus, including a floppy disk system 72 and a fixed disk system 74, among others.

Referring now to FIG. 2, a block diagram of the ISA circuit board 52 is shown. The ISA circuit board 52 includes an ISA logic block 102 which performs the various functions of the board. For example, the board 52 may be a network interface board or a video board, etc. The ISA board 52 also preferably includes EISA feature logic 104 which is designed to take advantage of the automatic software configuration feature as well as the faster DMA rates available on the EISA bus 26. The ISA board 52 also includes expansion bus type determination logic 106 according to the present invention which determines whether the board 52 is situated on an ISA bus or an EISA bus. As discussed below, the expansion bus type determination logic 106 provides a signal to the EISA feature logic 104 to enable the EISA feature logic 104. If the expansion bus type determination logic 106 determines that the board is situated on the EISA bus 26, the expansion bus type determination logic 106 enables the EISA feature logic 104. However, if the board 52 is determined to be configured in an ISA system (not shown), then the expansion bus type determination logic 106 disables the EISA feature logic 104.

The expansion bus type determination logic 106 can be embodied in any type of circuit, such as a programmable array logic (PAL) device or a discrete circuit, among others. In the preferred embodiment, the expansion bus determination logic 106 comprises a PAL device. The PAL device receives ISA input signals IORC*, IOWC*, AENx, BALE, RSTDRV, and BCLK from the respective expansion bus to which it is connected. Since these signals are all available on the ISA connector, the ISA board 52 receives these signals regardless of whether it is in an ISA or EISA system. A brief review of the operation of these signals is deemed appropriate. The IOWC* signal is an ISA signal which indicates an I/O write cycle. When the IOWC* signal is asserted and the respective AENx signal is negated, the I/O slave may latch data from the data bus. An ISA I/O slave drives data onto the bus when the IORC* or I/O read cycle signal is asserted and the AENx signal is negated. Also a DMA device may drive data onto the data bus after sampling IORC* asserted. The RSTDRV signal causes a hardware reset of ISA and EISA expansion boards when asserted. The RSTDRV signal is asserted by a controller referred to as the reset controller in the reset logic 25 during powerup or after a bus timeout. The BCLK signal is a clocking signal operating at approximately 8 MHz. The AENx and BALE signals were previously defined in the background.

The PAL generates a signal referred to as EISA, which indicates, when asserted high, that the board 52 resides in an EISA system. The equation of the EISA signal is as follows:

$$\begin{aligned} \text{EISA} \ := \ & \text{IORC} \cdot \text{RSTDRV*} \cdot \text{AENx} \cdot \text{BALE*} \\ + \ & \text{IOWC} \cdot \text{RSTDRV*} \cdot \text{AENx} \cdot \text{BALE*} \\ + \ & \text{EISA} \cdot \text{RSTDRV*} \end{aligned}$$

The EISA signal is asserted during either an I/O write or read cycle, signified by the IORC, or IOWC, signals being asserted, when the respective AENx signal is asserted and the BALE signal is negated. As previously discussed, during EISA slot-specific cycles, the AENx signal is negated low to the EISA device being accessed, and the AENx signals to the other slots are high. Thus the AENx signal to each ISA device is asserted high during a slot-specific I/O cycle, and the BALE signal is negated low. Therefore, the above equation decodes an EISA slot-specific I/O cycle. The third minterm of the above equation maintains the EISA signal asserted until an expansion board reset.

A timing diagram of the operation of the PAL device during an EISA slot-specific cycle is illustrated in FIG. 4. As shown, during a slot-specific cycle to another location, the respective AENx signal to the board 52 is asserted high and the BALE signal is negated low after the START* signal is asserted. The START* signal is a signal used to provide timing control at the beginning of a cycle. If this condition occurs during either an I/O write or I/O read, as signified by either of the IORC* or IOWC* signals being asserted low, then the EISA signal is asserted. The EISA signal remains asserted until an I/O board reset (not shown) occurs. Slot-specific accesses always occur before any expansion boards are addressed because the power up self test (POST) features of EISA computers always access certain system board components, such as the interrupt and DMA controllers, before performing any slot-specific expansion board accesses. Thus, the expansion bus type determination logic 106 detects that the board 52 is in an EISA system before the board 52 is addressed. The EISA signal is preferably provided to enable the EISA feature logic 104 to allow the ISA board 52 to take advantage of the automatic configuration and faster DMA transfer rates available on the EISA bus 26. With this early enablement of the EISA feature logic 104, the ISA board 52 responds as if an EISA board during post operations, allowing automatic configuration as standard for EISA boards.

Referring now to FIG. 3, an alternate embodiment of the invention is shown where the expansion bus type determination logic 106 is implemented in a discrete circuit. As shown, the IORC* and IOWC* signals are connected to inputs of a two input AND gate 120 whose output is connected to an input of a two input NOR gate 122. The BALE signal is connected to the other input of the NOR gate 122. The output of the NOR gate 122 is connected to an input of a two input AND gate 124 whose other input receives the AENx signal for the respective ISA board 52. The output of the AND gate 124 is connected to an input of a two input OR gate 126. The output of the OR gate 126 is connected to the D input of a D-type flip-flop 128. The clock input of the flip-flop 128 receives the BCLK signal. The reset, or clear input of the flip-flop 130 receives the RSTDRV signal. The Q output of the flip-flop is the EISA signal and the EISA signal is connected to the other input of the OR gate 126. The discrete circuit illustrated in FIG. 4 generates the EISA signal according to the same conditions as the PAL described above.

Therefore, a circuit which automatically determines whether it is connected to an ISA or EISA system is disclosed. The circuit monitors the expansion bus for EISA slot-specific I/O cycles to determine whether the expansion bus is an ISA or EISA bus. This allows an ISA circuit board to take advantage of certain EISA features when it is installed in an EISA system and to act as an ISA board when it is installed in an ISA system.

The foregoing disclosure and description of the invention are illustrative and explanatory thereof, and various changes in the methods, components, circuit elements, wiring connections and contacts, as well as in the details of the illustrated circuitry and construction and method of operation may be made without departing from the spirit of the invention.

What is claimed is:

1. An apparatus for determining computer system type between a first type and a second type, the first type being a superset of the second type, a computer system of the second type including an expansion bus for transmitting certain signals in a predetermined format and using a second type of connector for receiving circuit boards, a computer system of the first type including an expansion bus for transmitting the expansion bus signals of the second type computer system in a slightly altered format and additional expansion bus signals and using a first type of connector for receiving circuit boards, the first type of connector capable of receiving circuit boards for the second type of computer system and providing the second type expansion bus signals and of receiving circuit boards for the first type of computer system and providing the second type and the additional expansion bus signals, the apparatus comprising:

means for receiving only the second type computer system expansion bus signals;

means coupled to said means for receiving for monitoring said received signals to determine if said received signals are in second type computer system format or first type computer system format; and means coupled to said means for monitoring for producing a signal having a first level if the determination indicates a first type computer system and a second level if the determination indicates a second type computer system.

2. The apparatus of claim 1, wherein the first type computer system conforms to the EISA standard and the second type computer system conforms to the ISA standard.

3. The apparatus of claim 2, wherein said means for monitoring said received signals monitors for slot-specific input/output cycles.

4. A circuit board for insertion into a computer system of a first type and a second type, the first type being a superset of the second type, a computer system of the second type including an expansion bus for transmitting certain signals in a predetermined format and using a second type of connector for receiving circuit boards, a computer system of the first type including an expansion bus for transmitting the expansion bus signals of the second type computer system in a slightly altered format and additional expansion bus signals and using a first type of connector for receiving circuit boards, the first type of connector capable of receiving circuit boards for the second type of computer system and providing the second type expansion bus signals and of receiving circuit boards for the first type of computer system and providing the second type and the additional expansion bus signals, the circuit board comprising:

an interface for insertion in a connector of the second type;

means for receiving only the second type computer system expansion bus signals;

means coupled to said means for receiving for monitoring said received signals to determine if said received signals are in second type computer system format or first type computer system format; and means coupled to said means for monitoring for producing a signal having a first level if the determination indicates a first type computer system and a second level if the determination indicates a second type computer system; and means for receiving said first or second type signal and activating capabilities useable in the first type of computer system and not used in the second type of computer system when said first or second type signal is at said first Level.

5. The apparatus of claim 4, wherein the first type computer system conforms to the EISA standard and the second type computer system conforms to the ISA standard.

6. The apparatus of claim 5, wherein said means for monitoring said received signals monitors for slot-specific input/output cycles.

7. A method for determining computer system type between a first type and a second type, the first type being a superset of the second type, a computer system of the second type including an expansion bus for transmitting certain signals in a predetermined format and using a second type of connector for receiving a circuit boards, a computer system of the first type including an expansion bus for transmitting the expansion bus signals of the second type computer system in a slightly altered formal and additional expansion bus signals and using a first type of connector for receiving circuit boards, the first type of connector capable of receiving circuit boards for the second type of computer system and providing the second type expansion bus signals and of receiving circuit boards for the first type of computer system and providing the second type and the additional expansion bus signals, the method comprising:

receiving only the second type computer system expansion bus signals;

monitoring said received signals to determine if said received signals are in second type computer system format or first type computer system format; and producing a signal having a first level if the determination indicates a first type computer system and a second level if the determination indicates a second type computer system.

8. The method of claim 7, wherein the first type computer system conforms to the EISA standard and the second type computer system conforms to the ISA standard.

9. The method of claim 8, wherein said step of monitoring said received signals monitors for slot-specific input/output cycles.

10. A method for determining expansion bus type in a computer system including an expansion bus of a first type, wherein the first type expansion bus is a superset of an expansion bus of a second type, the method comprising:

monitoring bus cycles on the first type expansion bus; and indicating that the first type expansion bus is of the first type when a bus cycle of a first type is performed.

11. The method of claim 10, wherein the first type expansion bus conducts said first type bus cycles and said first type bus cycles are not conducted by the second type expansion bus.

13. The method of claim 11, wherein the first type expansion bus is based on the EISA standard and said first type bus cycles are EISA slot-specific input/output cycles.

13. The method of claim 10, wherein the computer system further includes an expansion board compatible with the second type expansion bus which includes feature logic that can take advantage of features provided by the first type expansion bus when said expansion board is connected to the first type expansion bus, the method further comprising:

enabling said feature logic when said step of indicating indicates that the first type expansion bus is of said first type.

* * * * *